(12) United States Patent
Shankar et al.

(10) Patent No.: US 11,991,037 B2
(45) Date of Patent: May 21, 2024

(54) SYSTEMS AND METHODS FOR REDUCING A QUANTITY OF FALSE POSITIVES ASSOCIATED WITH RULE-BASED ALARMS

(71) Applicant: Verizon Patent and Licensing Inc., Basking Ridge, NJ (US)

(72) Inventors: Bharatwaaj Shankar, Chennai (IN); Srinivasarao Valluru, Hyderabad (IN); Ria V. Sijo, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 529 days.

(21) Appl. No.: 17/170,098

(22) Filed: Feb. 8, 2021

(65) Prior Publication Data

US 2022/0255791 A1    Aug. 11, 2022

(51) Int. Cl.
*H04L 41/0631*    (2022.01)
*G06N 5/04*    (2023.01)
*G06N 20/00*    (2019.01)
*H04L 9/40*    (2022.01)
*H04L 41/0681*    (2022.01)

(52) U.S. Cl.
CPC .......... *H04L 41/0636* (2013.01); *G06N 5/04* (2013.01); *G06N 20/00* (2019.01); *H04L 41/0681* (2013.01); *H04L 63/1416* (2013.01); *H04L 63/1441* (2013.01); *H04L 63/20* (2013.01)

(58) Field of Classification Search
CPC ..... H04L 41/0636; H04L 63/20; H04L 41/16; H04L 63/1466; H04L 63/0263; H04L 63/1425; H04L 41/0681; H04L 63/1416; H04L 63/1441; H04L 41/0604; G06N 5/04; G06N 20/00; G06N 5/01
See application file for complete search history.

(56) References Cited

U.S. PATENT DOCUMENTS

| | | | | |
|---|---|---|---|---|
| 7,475,405 | B2* | 1/2009 | Manganaris | ........ H04L 63/1458 706/45 |
| 10,872,339 | B1* | 12/2020 | Kramme | ................ G06N 20/00 |
| 2012/0174217 | A1* | 7/2012 | Ormazabal | ......... H04L 63/1458 726/22 |
| 2012/0317058 | A1* | 12/2012 | Abhulimen | ............ G06N 20/00 706/2 |
| 2015/0067857 | A1* | 3/2015 | Symons | ................. G06N 20/00 726/23 |
| 2015/0254555 | A1* | 9/2015 | Williams, Jr. | ......... G06N 3/045 706/14 |
| 2015/0356445 | A1* | 12/2015 | Lingafelt | ............... G06N 5/025 706/47 |

(Continued)

*Primary Examiner* — Kenneth W Chang

(57) ABSTRACT

A device may receive alarm data identifying alarms associated with an occurrence of an event, and may identify, from the alarm data, a set of alarms that include false positives. The device may perform feature engineering on the set of alarms to extract features from a feature store and may train a model with the features to generate a trained model. The device may process the alarm data, with the trained model, to determine rules for reducing a quantity of future alarms that include the false positives, and may identify, from the rules for reducing the quantity of future alarms, a set of rules that satisfy a threshold for reducing the quantity of future alarms. The device may perform one or more actions based on the set of rules.

20 Claims, 10 Drawing Sheets

(56) References Cited

U.S. PATENT DOCUMENTS

| | | | |
|---|---|---|---|
| 2015/0379428 A1* | 12/2015 | Dirac | G06N 20/00 |
| | | | 706/12 |
| 2016/0088006 A1* | 3/2016 | Gupta | H04L 41/149 |
| | | | 706/12 |
| 2016/0219067 A1* | 7/2016 | Han | H04L 63/1425 |
| 2018/0046934 A1* | 2/2018 | Aravkin | G06F 21/562 |
| 2018/0089437 A1* | 3/2018 | Baset | G06F 21/577 |
| 2020/0342556 A1* | 10/2020 | Zoldi | G06Q 50/26 |
| 2020/0356544 A1* | 11/2020 | Chakraborty | G06F 16/2365 |

* cited by examiner

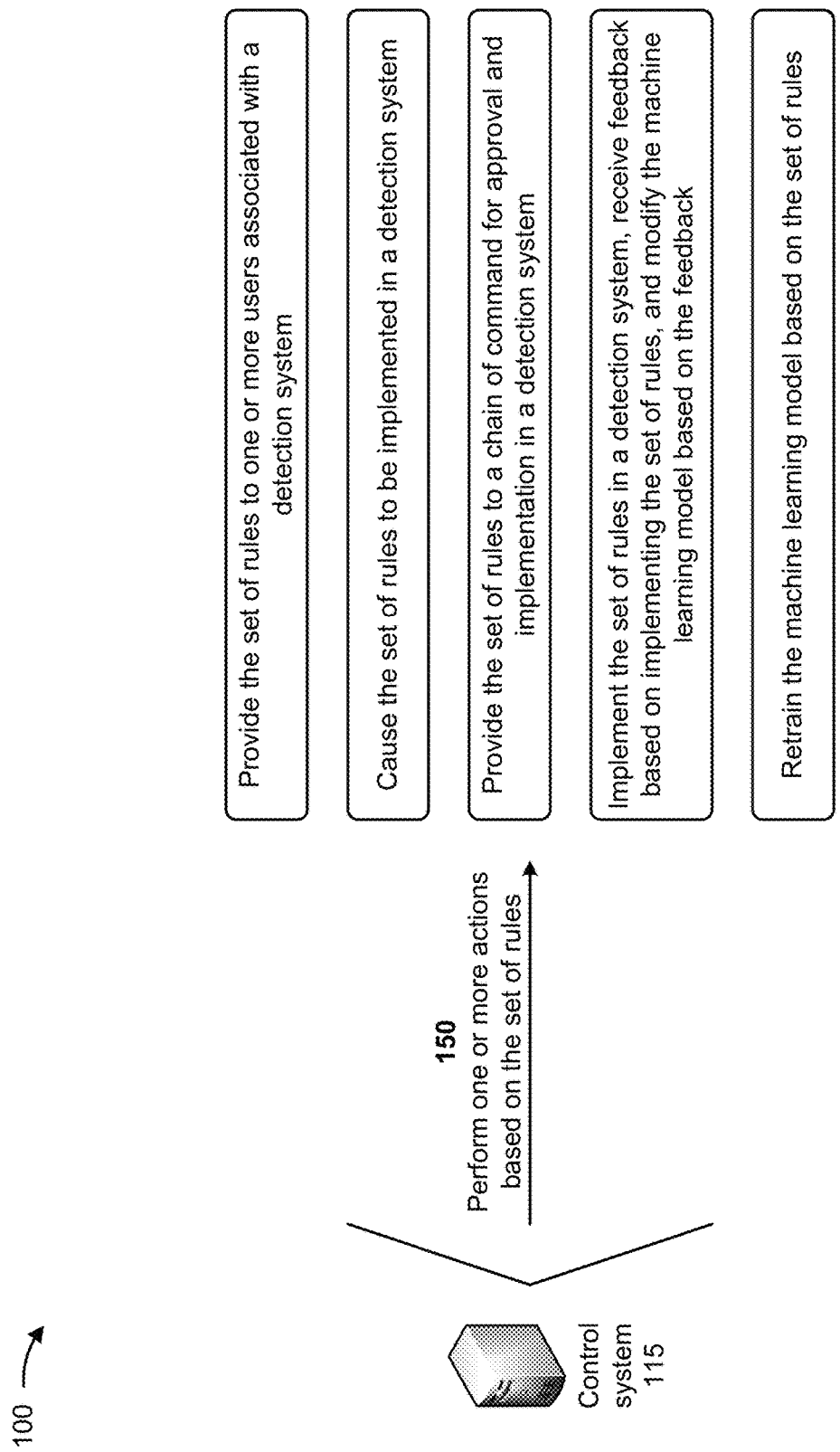

SYSTEMS AND METHODS FOR REDUCING A QUANTITY OF FALSE POSITIVES ASSOCIATED WITH RULE-BASED ALARMS

BACKGROUND

A device may utilize a set of rules to detect an occurrence of an event, such as an occurrence of a network information security breach. The detection of the occurrence of the event may cause the device to output an alarm intended to alert a user to the occurrence of the event.

BRIEF DESCRIPTION OF THE DRAWINGS

FIGS. 1A-1F are diagrams of an example associated with reducing a quantity of false positive alarms associated with rule-based alarms.

DETAILED DESCRIPTION OF PREFERRED EMBODIMENTS

Figure 1A:
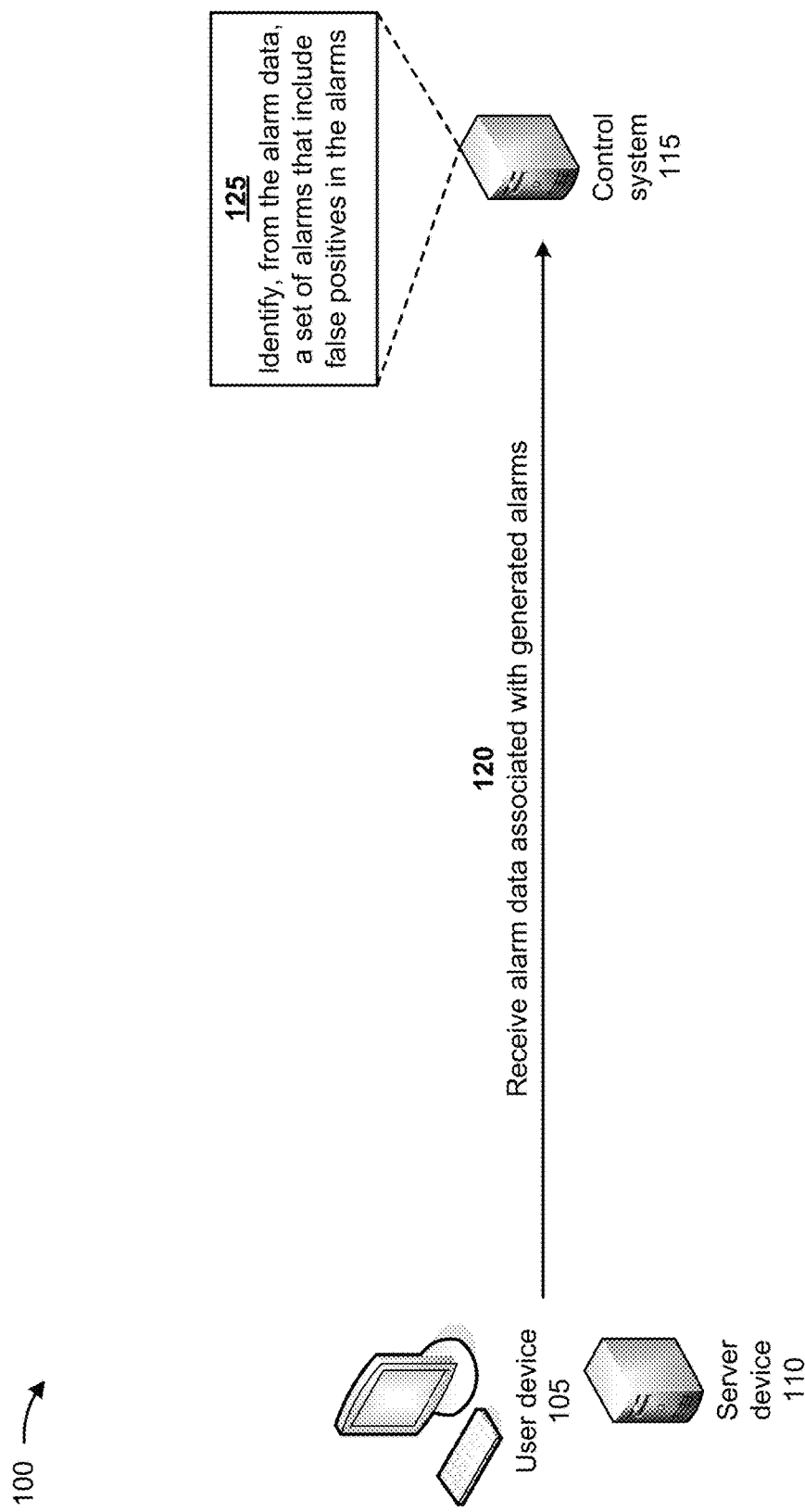

The following detailed description of example implementations refers to the accompanying drawings. The same reference numbers in different drawings may identify the same or similar elements.

Rule-based alarms used to detect an occurrence of an event typically start generating false positives in the alarms due to changes in patterns associated with the occurrence of the event. The performance of an alarm rule may be continuously monitored, and the alarm rule may be updated based on a quantity of false positives in the alarms generated based on the alarm rule. However, current techniques for monitoring and updating alarm rules require time and manual effort in deriving new rules to reduce false positives in alarms. For example, a significant quantity of time and, often human, resources are required to collect and analyze alarms, determine false positives in alarms, identify patterns in the false positives in the alarms, and determine or update alarm rules based on the patterns. Thus, current techniques for monitoring and updating alarm rules waste computing resources (e.g., processing resources, memory resources, communication resources, and/or the like), networking resources, human resources, and/or the like associated with incorrectly identifying patterns in false positive alarms, determining incorrect alarm rules based on the incorrectly identified patterns, handling customer complaints associated with the false positive alarms, and/or the like.

Some implementations described herein provide a control system that reduces a quantity of false positives in rule-based alarms. For example, the control system may receive alarm data identifying alarms associated with an occurrence of an event, and may identify, from the alarm data, a set of alarms that include false positives in the alarms. The control system may perform feature engineering on the set of alarms to extract features from a feature store. For example, the set of alarms are generated by a network security detection system and the features include features associated with the occurrence of a network security event, such as a network breach, a denial of service attack, and/or the like. As another example, the set of alarms are generated by a fraud detection system and the features include features associated with the occurrence of fraud, such as a fraudulent transaction, identity theft, and/or the like. The control system may train, based on the features, a machine learning model, for example a classification and regression tree (CART) model with the features to generate a trained model. The control system may process the alarm data, with the trained model, to determine rules for reducing a quantity of future false positives in alarms, and may identify, from the rules for reducing the quantity of future false positives in alarms, a set of rules that satisfy a threshold for reducing the quantity of future false positives in alarms. The control system may perform one or more actions based on the set of rules.

In this way, the control system reduces a quantity of false positives in rule-based alarms. The control system may proactively monitor the performance of rule-based alarms and may utilize a machine learning model to recommend rule changes for reducing generation of false positives in alarms. The control system may reduce a cycle time associated with mitigating false positives for rule-based alarms. The machine learning model may determine rules that are most important in detecting an occurrence of an event and reducing a quantity of false positives in alarms. Thus, the control system conserves computing resources, networking resources, human resources, and/or the like associated with incorrectly identifying patterns in false positives in alarms, determining incorrect alarm rules based on the incorrectly identified patterns, handling customer complaints associated with the false positives in alarms, and/or the like.

FIGS. 1A-1F are diagrams of an example 100 associated with reducing a quantity of false positives in rule-based alarms. As shown in FIGS. 1A-1F, example 100 includes a user device 105, a server device 110, and a control system 115. User device 105 may include a wireless communication device, a mobile phone, a laptop computer, a tablet computer, a desktop computer, and/or the like. Server device 110 may provide a detection system that generates alarms associated with the detection of an occurrence of an event. For example, the server device 110 may generate an alarm based on detecting an occurrence of a network security event (e.g., a network breach, a denial of service attack, and/or the like), fraud (e.g., fraud that involves cell phones, insurance claims, tax return claims, credit card transactions, and/or the like), and/or an occurrence of another type of event. Control system 115 may include a system that reduces a quantity of false positives in rule-based alarms, as described herein.

As shown in FIG. 1A, and by reference number 120, the control system 115 receives alarm data associated with generated alarms from the user device 105 and/or the server device 110. For example, the control system 115 may receive alarm data associated with alarms based on the detection system detecting an occurrence of a potential network security issue, fraud, and/or the like.

In some implementations, the alarm data may include information associated with a plurality of different alarms. For example, the alarm data may include first alarm data associated with a first alarm that is triggered based on a first rule and second alarm data associated with a second alarm that is triggered based on a second, different rule. The first alarm data may include information identifying the first rule, information used to determine that the first rule was satisfied, information indicating whether the first alarm corresponds to a false positive alarm, and/or the like. The second alarm data may include information identifying the second rule, information used to determine that the second rule was satisfied, information indicating whether the second alarm corresponds to a false positive alarm, and/or the like.

The information used to determine that the first (or second) rule was satisfied may include information identifying a set of conditions (e.g., an occurrence of a quantity of data transmissions from a particular source address, a quantity of users utilizing a same set of authentication credentials (e.g., a username and a password) to access a device, a network, and/or the like, an occurrence of a quantity of transactions within a particular amount of time, a transaction associated with a dollar amount that is greater than a threshold dollar amount, and/or the like) that, when satisfied, indicate an occurrence of potentially fraudulent activity and/or cause the first (or second) alarm to be generated. Alternatively, and/or additionally, the information used to determine that the first (or second) rule was satisfied may include information associated with the satisfaction of a condition included in the set of conditions, such as information identifying a source address associated with a network breach, information identifying a port of a device associated with the network breach, information identifying a time associated with the network breach, information identifying a time of a transaction associated with potentially fraudulent activity, information identifying a dollar amount associated with the transaction, information identifying a location associated with the transaction, and/or the like. The information indicating whether the first (or second) alarm corresponds to a false positive alarm may include information indicating that a user confirmed the occurrence of fraudulent activity (e.g., information indicating that a user provided information identifying a transaction as an unauthorized transaction), that a user indicated that the first alarm was a false positive alarm (e.g., information indicating that a user provided information identifying a transaction as an authorized transaction), and/or the like.

In some implementations, the control system 115 receives the alarm data from a detection system that generates the alarms associated with the alarm data. For example, the control system 115 may receive the alarm data from a network security detection system, a fraud detection system, and/or the like executing on the user device 105 and/or the server device 110. The control system 115 may receive the alarm data from the detection system periodically (e.g., hourly, daily, weekly, and/or the like), based on an occurrence of an event (e.g., based on an alarm being triggered, based on a particular quantity of alarms being triggered, and/or the like), based on the control system 115 requesting the alarm data from the detection system, and/or the like.

As shown by reference number 125, the control system 115 identifies, from the alarm data, a set of alarms that include false positives in the alarms. In some implementations, the control system 115 identifies a plurality of alarms that include false positives based on the information indicating whether an alarm (e.g., the first alarm and/or the second alarm) corresponds to an alarm that includes a false positive in the alarm. Alternatively, and/or additionally, the control system 115 may identify the set of alarms that include false positives in the alarms based on user input. For example, a user may input information indicating that an alarm corresponds to an alarm that includes a false positive via a user interface provided by the user device 105. The user device 105 may include the input information in the alarm data and/or provide the input information to the control system 115. The control system 115 may receive the information from the user device 105 and may identify the alarm as including a false positive based on the received information.

In some implementations, the control system 115 determines the set of alarms that include false positives in the alarms based on a set of top false positive generating alarms. The control system 115 may determine a quantity of occurrences of each type of alarm that includes a false positive (e.g., a quantity of occurrences of a first alarm including a false positive, a quantity of occurrences of a second alarm including a false positive, and/or the like) based on the alarm data. In some implementations, the set of top false positive generating alarms includes a type of alarm having a greatest quantity of occurrences of false positives relative to other types of alarms. Alternatively, and/or additionally, the set of top false positive generating alarms includes a type of alarm having a quantity of occurrences of false positives that satisfies one or more criteria (e.g., satisfies a false positive occurrence quantity threshold). The control system 115 may identify the set of top false positive generating alarms as the set of alarms that include false positive in the alarms.

Alternatively, and/or additionally, the control system 115 may determine hit rates (e.g., quantity of occurrences) associated with the plurality alarms based on the alarm data. The control system 115 may identify a group of alarms associated with a hit rate that satisfies hit rate criteria (e.g., satisfies a hit rate threshold). The control system 115 may determine precisions associated with the group of alarms. The precision associated with an alarm may indicate a percentage of the quantity of occurrences of the alarm that include false positives. The control system 115 may identify a set of alarms associated with a precision that satisfies precision criteria (e.g., satisfies a precision threshold). The control system 115 may identify the set of alarms as the set of alarms that include false positives in the alarms based on the set of alarms being associated with a hit rate that satisfies the hit rate criteria.

Figure 1B:
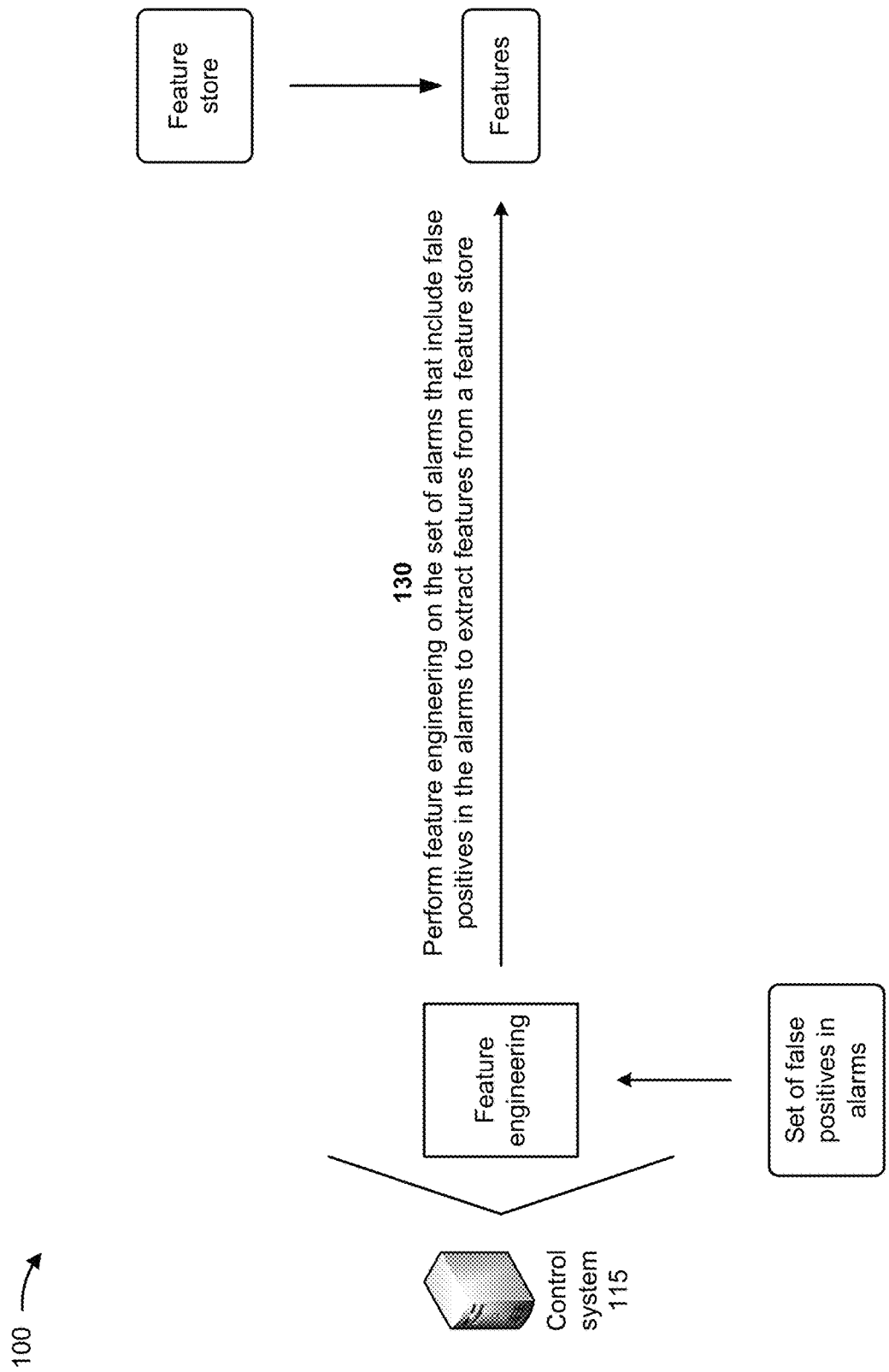

As shown in FIG. 1B, and by reference number 130, the control system 115 performs feature engineering on the set of alarms that include false positive alarms to extract features from a feature store. The features may include attributes or variables associated with observations related to detecting an occurrence of an event (e.g., fraud detection, a network security issue, and/or the like), as described in greater detail below with respect to FIG. 2. The control system 115 may perform feature engineering to determine features relevant to detecting an occurrence of an event, such as an occurrence of a network breach, an occurrence of fraud, and/or the like. In some implementations, the control system 115 performs data binning on portions of the alarm data associated with the set of alarms that include false positives in the alarms (e.g., information used to determine that a rule associated with a false positive alarm was satisfied) to generate a binning mapping file and a binned feature set that corresponds to the features extracted from the set of alarms that include false positives in the alarms.

The feature store may include a data structure storing features associated with rule-based alarms. The control system 115 may obtain features from the feature store based on the types of alarms associated with the set of alarms that include the false positives in the alarms, features included in the set of alarms that include the false positives in the alarms, and/or the like. For example, the control system 115 may determine a type of alarm associated with an alarm included in the set of alarms that include the false positives in the alarms and may obtain, from the feature store, features associated with the type of alarm.

Figure 1C:
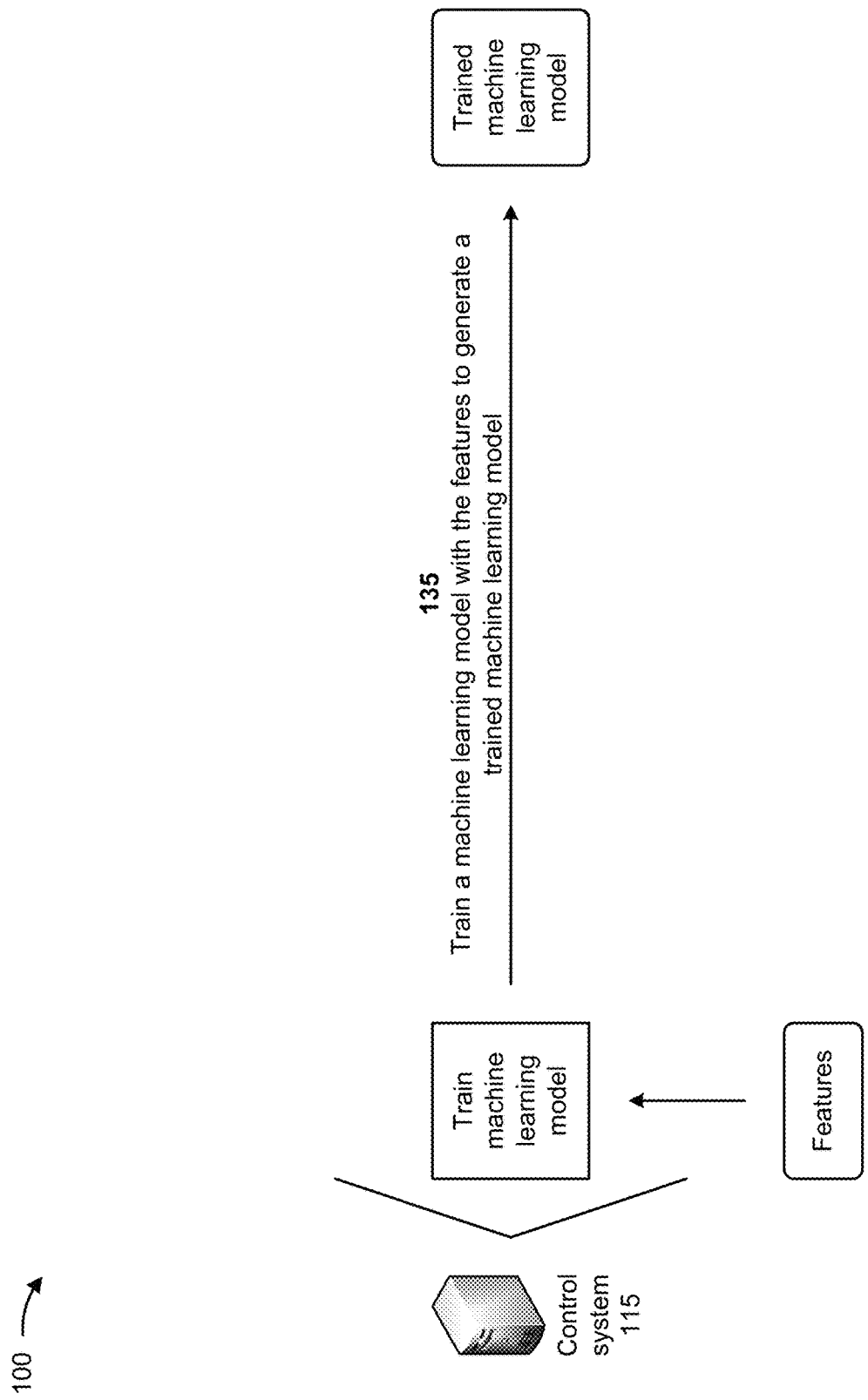

The control system 115 may generate a machine learning model configured to analyze the obtained features. For example, the control system 115 may generate a CART model, a similarity-based model, and/or another type of model that provides rule-based outcomes. As shown in FIG. 1C, and by reference number 135, the control system 115 trains the machine learning model with the features to generate a trained machine learning model.

In some implementations, the set of alarms are generated by a network security detection system and the features include features associated with the occurrence of a network security event, such as a network breach, a denial of service attack, and/or the like. For example, a feature may include information identifying a source address associated with a network security event, a port of a network device associated with the network security event, a configuration setting of the network device, and/or the like.

In some implementations, the set of alarms are generated by a fraud detection system and the features include features associated with the occurrence of fraud, such as a fraudulent transaction, identity theft, and/or the like. For example, a feature may include information identifying a dollar amount of a transaction, a quantity of transactions occurring within a particular time period, a location of a transaction, and/or the like.

In some implementations, the control system 115 builds a decision tree model on top of the features to generate a decision tree classifier model. The decision tree model may include a model of computation in which an algorithm adaptively performs a sequence of queries or tests in a manner that enables an outcome of a previous query or test to influence a subsequent query or test. The decision tree classifier model may utilize a decision tree (e.g., a representation for classifying examples) as a predictive model to determine a target value (e.g., false positive, no false positive, network security breach, no network security breach, fraud, no fraud, and/or the like) based on a set of observations.

The control system 115 may determine a set of rules associated with detecting an occurrence of an event based on the decision tree classifier model. For example, the control system 115 may determine a rule based on a series of observations, included in a decision tree of the decision tree classifier model that leads to a particular target value (e.g., false positive, network security breach, fraud, and/or the like). The control system 115 may generate a rules file based on the set of rules. The decision tree classifier model and/or the rules file may correspond to the trained machine learning model. In some implementations, the machine learning model runs a GridSearch Cross (e.g., a library function utilized to loop through predefined hyperparameters and to fit the machine learning model on the extracted features) based on all possible combinations of the rules to determine a decision tree to be utilized by the machine learning model.

In some implementations, the control system 115 may train the machine learning model in a manner similar to that described below with respect to FIG. 2. Alternatively, and/or additionally, the control system 115 may obtain a trained machine learning model from another device.

Figure 1D:
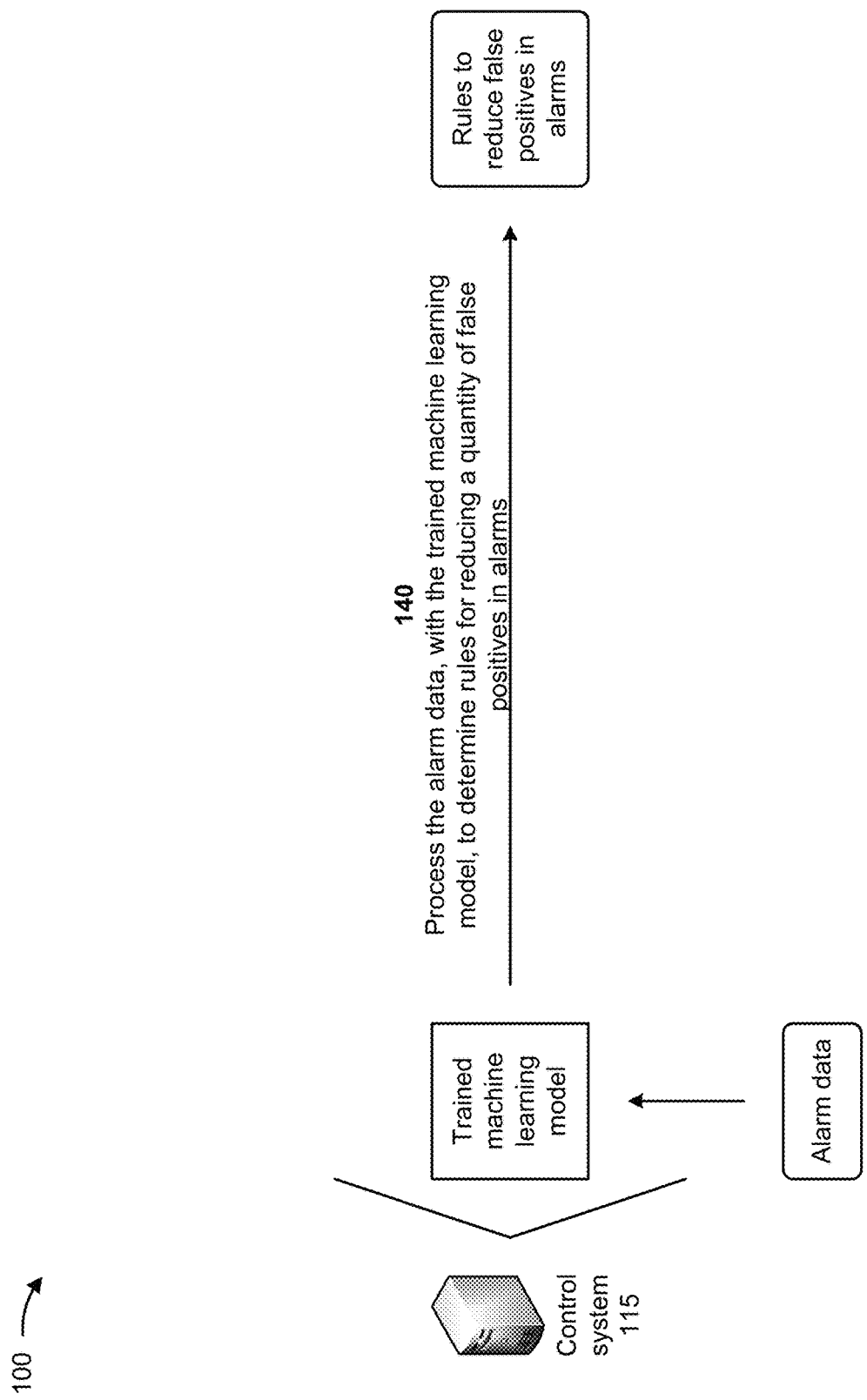

As shown in FIG. 1D, and by reference number 140, the control system 115 processes the alarm data, with the trained machine learning model, to determine rules for reducing a quantity of false positives in alarms. The control system 115 may utilize the trained machine learning model to process the alarm data based on the set of rules associated with detecting an occurrence of an event (e.g., an occurrence of a network security breach, fraud, and/or the like). The control system 115 may determine a group of rules that, when utilized to process the alarm data, result in a fewer quantity of false positives in alarms relative to the quantity of false positives in alarms included in the alarm data. The control system 115 may determine the rules for reducing a quantity of false positives in alarms based on the group of rules.

In some implementations, the control system 115 converts the alarm data into a format that enables the trained machine learning model to process the alarm data. The control system 115 may process the alarm data, with the trained machine learning model, based on converting the alarm data into the format that enables the trained machine learning model to process the alarm data.

Figure 1E:
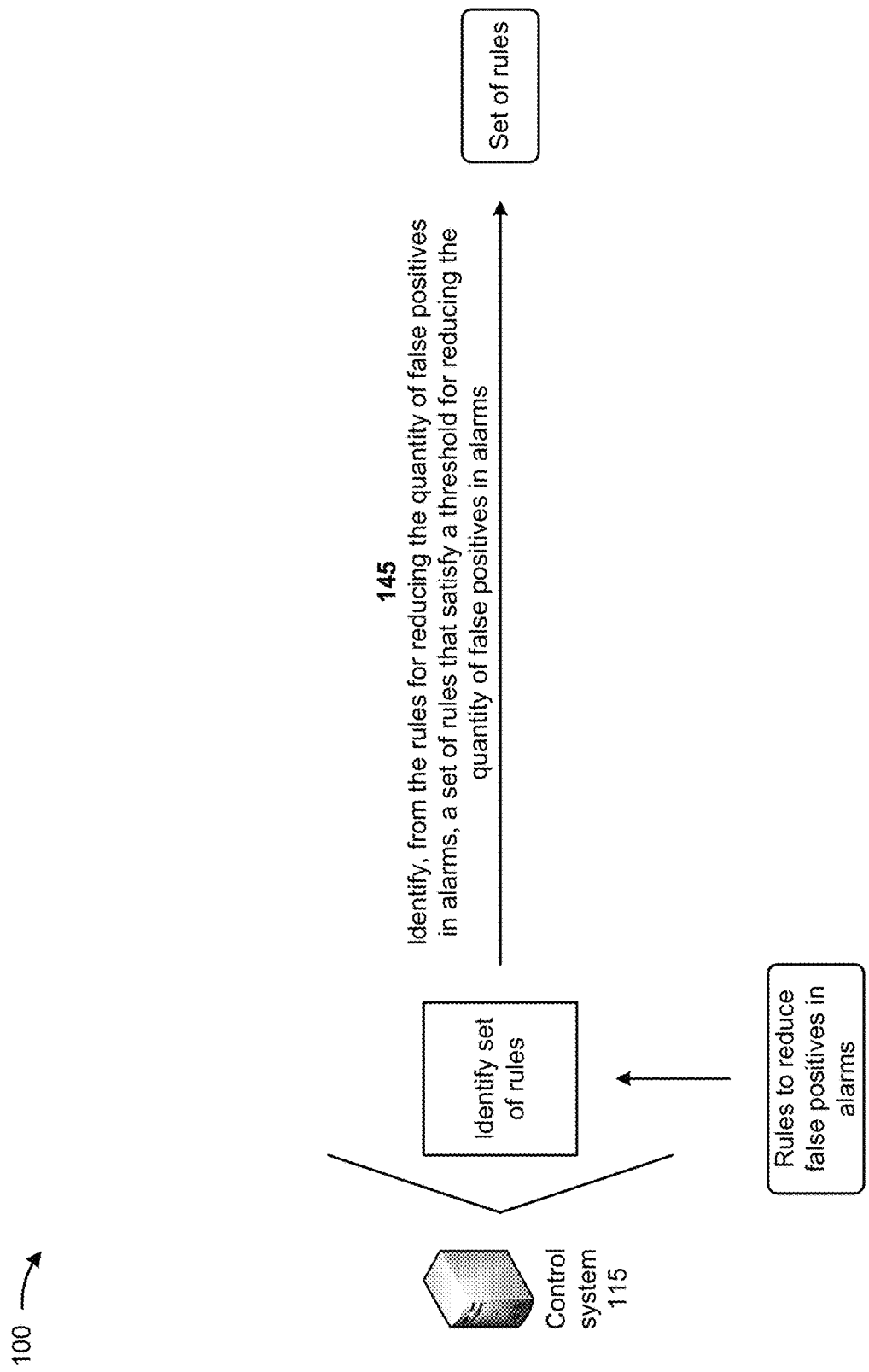

As shown in FIG. 1E, and by reference number 145, the control system 115 identifies, from the rules for reducing the quantity of false positives in alarms, a set of rules that satisfy a threshold for reducing the quantity of false positives in alarms. The control system 115 may determine a respective quantity of false positives in alarms associated with utilizing each rule, of the set of rules, to analyze the alarm data. The control system 115 may determine whether a difference between the quantity of false positives in alarms included in the alarm data and the quantity of false positives in alarms determined for a rule, of the set of rules, satisfies a difference threshold. The control system 115 may include the rule in the set of rules when the difference satisfies the difference threshold.

In some implementations, the control system 115 determines recalls associated with the rules for reducing the quantity of false positives in alarms. The control system 115 may determine precisions to reduce false positives in alarms associated with the rules for reducing the quantity of false positives in alarms. The control system 115 may determine abilities to detect additional occurrences of event associated with the rules for reducing the quantity of false positive alarms. The control system 115 may identify the set of rules based on the recalls, the precisions to reduce false positives in alarms, and/or the abilities to detect additional occurrences of events.

As shown in FIG. 1F, and by reference number 150, the control system 115 performs one or more actions based on the set of rules. In some implementations, the one or more actions include the control system 115 providing the set of rules to one or more users associated with a detection system and/or providing the set of rules to a chain of command for approval and implementation in a detection system. For example, the control system 115 may provide the set of rules, information identifying reduction in a quantity of false positives associated with the set of rules, and/or the like to a user device associated with a supervisor associated with the detection system. The supervisor may analyze the set of rules, the information identifying reduction in a quantity of false positives associated with the set of rules, and/or the like and may determine whether to implement the set of rules and/or may forward the set of rules to a next user in the chain of command (e.g., a supervisor of the supervisor) based on the analysis.

In some implementations, the one or more actions include the control system 115 causing the set of rules to be implemented in a detection system. For example, the control system 115 may receive information indicating that the set of rules are to be implemented in a detection system from the user device associated with the supervisor based on the supervisor inputting information indicating that the set of rules are to be implemented in the detection system via a user interface associated with the control system 115. The control system 115 may provide the set of rules to the detection system (e.g., the user device 105 and/or the server device 110) to cause the detection system to implement the set of rules.

Alternatively, and/or additionally, the control system 115 may cause the set of rules to be automatically implemented in the detection system. For example, the control system 115 may determine that the set of rules reduces the quantity of false positives in alarms by at least a threshold amount. The control system 115 may provide the set of rules to the detection system to cause the detection system to automatically implement the set of rules based on the set of rules reducing the quantity of false positives in alarms by at least the threshold amount.

In some implementations, the one or more actions include the control system 115 implementing the set of rules in a detection system, receiving feedback based on implementing the set of rules, and modifying the machine learning model based on the feedback. For example, the control system 115 may provide the set of rules to a detection system to cause the detection system to implement the set of rules, in a manner similar to that described above. The control system 115 may receive feedback associated with the implementing the set of rules (e.g., a quantity of false positives in alarms associated with a particular rule, of the set of rules). The control system 115 may modify the machine learning model based on the feedback. For example, the control system 115 may modify the particular rule, remove the particular rule from the set of rules, and/or the like based on the quantity of false positives in alarms associated with the rule.

In some implementations, the one or more actions include retraining the machine learning model based on the set of rules. The control system 115 may utilize the set of rules and/or alarm data associated with the set of rules as additional training data for retraining the machine learning model, thereby increasing the quantity of training data available for training the machine learning model. Accordingly, the control system 115 may conserve computing resources associated with identifying, obtaining, and/or generating historical data for training the machine learning model relative to other systems for identifying, obtaining, and/or generating historical data for training machine learning models.

In this way, control system 115 reduces a quantity of false positives in rule-based alarms. Control system 115 may proactively monitor the performance of alarms and may utilize a machine learning model to recommend rule changes for reducing generation of false positives in the alarms. Control system 115 may reduce a cycle time associated with mitigating false positives in rule-based alarms. The machine learning model may determine rules that are most important in determining an occurrence of an event and reducing a quantity of false positives in alarms generated based on determining the occurrence of the event. Thus, control system 115 conserves computing resources, networking resources, human resources, and/or the like associated with incorrectly identifying patterns in false positives in alarms, determining incorrect alarm rules based on the incorrectly identified patterns, handling customer complaints associated with the false positives in alarms, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
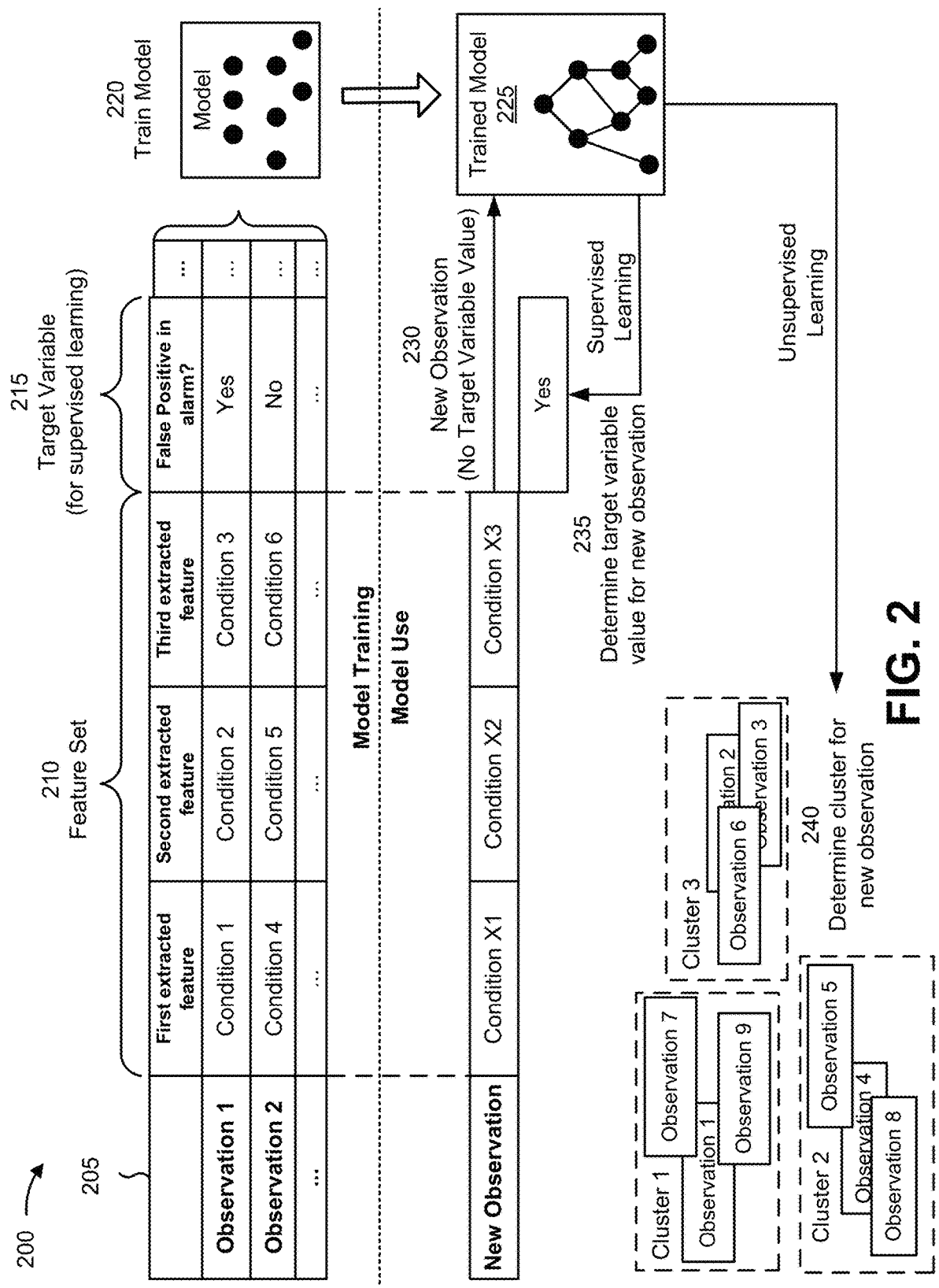
FIG. 2 is a diagram illustrating an example of training and using a machine learning model in connection with reducing a quantity of false positive alarms associated with rule-based alarms.

FIG. 2 is a diagram illustrating an example 200 of training and using a machine learning model in connection with reducing a quantity of false positives in rule-based alarms. The machine learning model training and usage described herein may be performed using a machine learning system. The machine learning system may include or may be included in a computing device, a server, a cloud computing environment, or the like, such as the control system 115 described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the control system 115, the user device 105, and/or the server device 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the control system 115, the user device 105, and/or the server device 110. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of first extracted features, a second feature of second extracted features, a third feature of third extracted features, and so on. As shown, for a first observation, the first feature may have a value of condition 1, the second feature may have a value of condition 2, the third feature may have a value of condition 3, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is whether there is a false positive in an alarm, which has a value of yes for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of condition X1, a second feature of condition X2, a third feature of condition X3, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of yes for the target variable of whether there is a false positive in an alarm for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, modifying a rule associated with the alarm. The first automated action may include, for example, implementing the rule associated with the alarm.

As another example, if the machine learning system were to predict a value of no for the target variable of whether there is a false positive in an alarm, then the machine learning system may provide a second (e.g., different) recommendation (e.g., do not modify the rules associated with the alarm) and/or may perform or cause performance of a second (e.g., different) automated action.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a false positive included in the alarm cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a no false positive included in the alarm cluster), then the machine learning system may provide a second (e.g., different) recommendation, such as the second recommendation described above and/or may perform or cause performance of a second automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to reduce a quantity of false positives in rule-based alarms. The machine learning system enables recognition and/or identification of tens, hundreds, thousands, or millions of features and/or feature values for tens, hundreds, thousands, or millions of observations, thereby increasing accuracy and consistency and reducing delay associated with reducing a quantity of false positives in rule-based alarms relative to requiring computing resources to be allocated for tens, hundreds, or thousands of operators to manually reduce a quantity of false positives in rule-based alarms using the features or feature values.

As indicated above, FIG. 2 is provided as an example. Other examples may differ from what is described in connection with FIG. 2.

Figure 3:
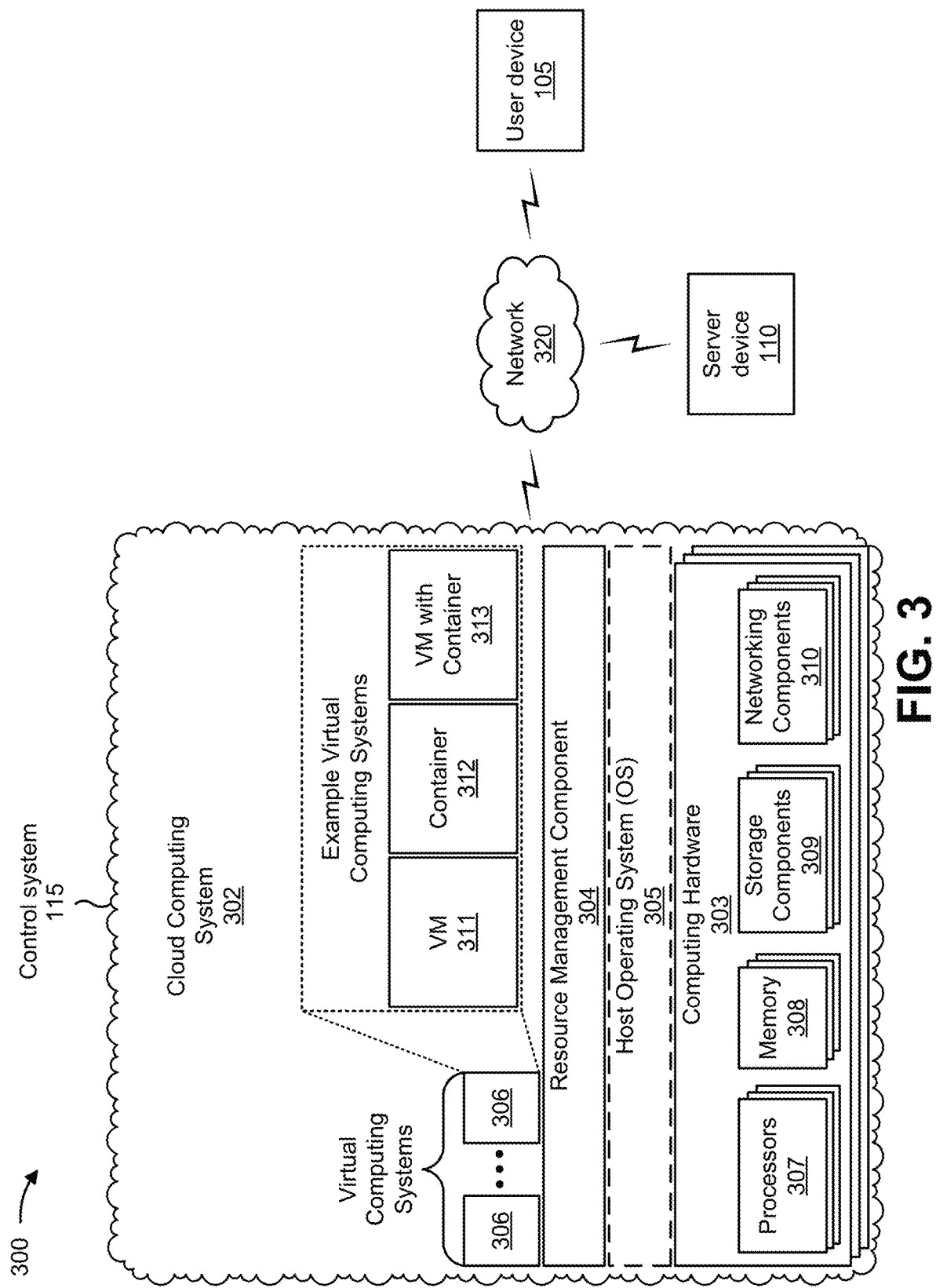
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include control system 115, which may include one or more elements of and/or may execute within a cloud computing system 302. The cloud computing system 302 may include one or more elements 303-313, as described in more detail below. As further shown in FIG. 3, environment 300 may include a network 320, user device 105, and/or server device 110. Devices and/or elements of environment 300 may interconnect via wired connections and/or wireless connections.

User device 105 includes one or more devices capable of receiving, generating, storing, processing, and/or providing information, as described elsewhere herein. User device 105 may include a communication device and/or a computing device. For example, user device 105 may include a wired or wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

Server device 110 includes one or more devices capable of receiving, generating, storing, processing, providing, and/or routing information, as described elsewhere herein. Server device 110 may include a communication device and/or a computing device. For example, server device 110 may include a server, such as an application server, a client server, a web server, a database server, a host server, a proxy server, a virtual server (e.g., executing on computing hardware), or a server in a cloud computing system. In some implementations, server device 110 includes computing hardware used in a cloud computing environment.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the control system 115 may include one or more elements 303-313 of the cloud computing system 302, may execute within the cloud computing system 302, and/or may be hosted within the cloud computing system 302, in some implementations, the control system 115 may not be cloud-based (e.g., may be implemented outside of a cloud computing system) or may be partially cloud-based. For example, the control system 115 may include one or more devices that are not part of the cloud computing system 302, such as device 400 of FIG. 4, which may include a stand-alone server or another type of computing device. The control system 115 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
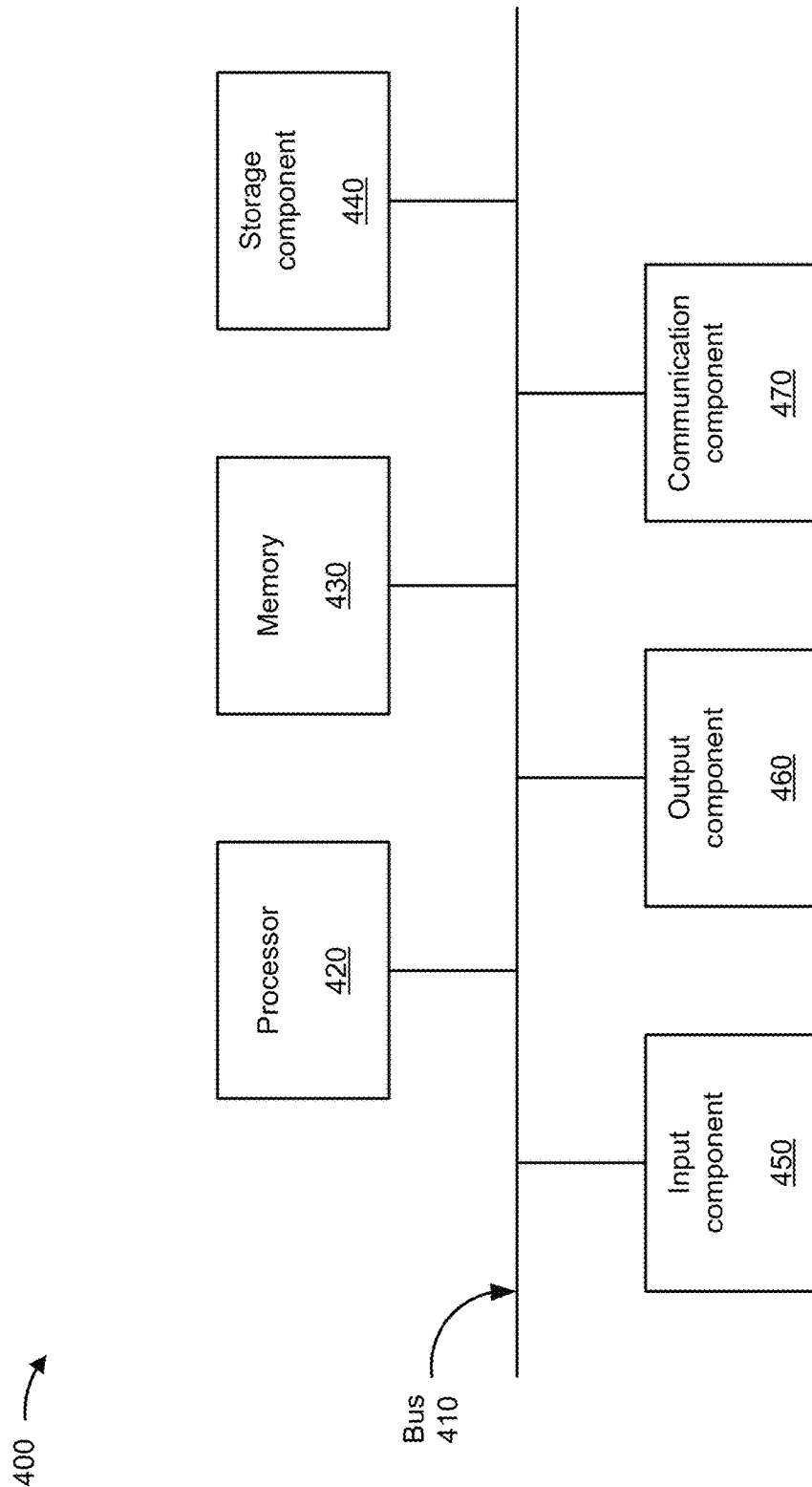
FIG. 4 is a diagram of example components of one or more devices of FIG. 3.

FIG. 4 is a diagram of example components of a device 400, which may correspond to user device 105, server device 110, and/or control system 115. In some implementations, user device 105, server device 110, and/or control system 115 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
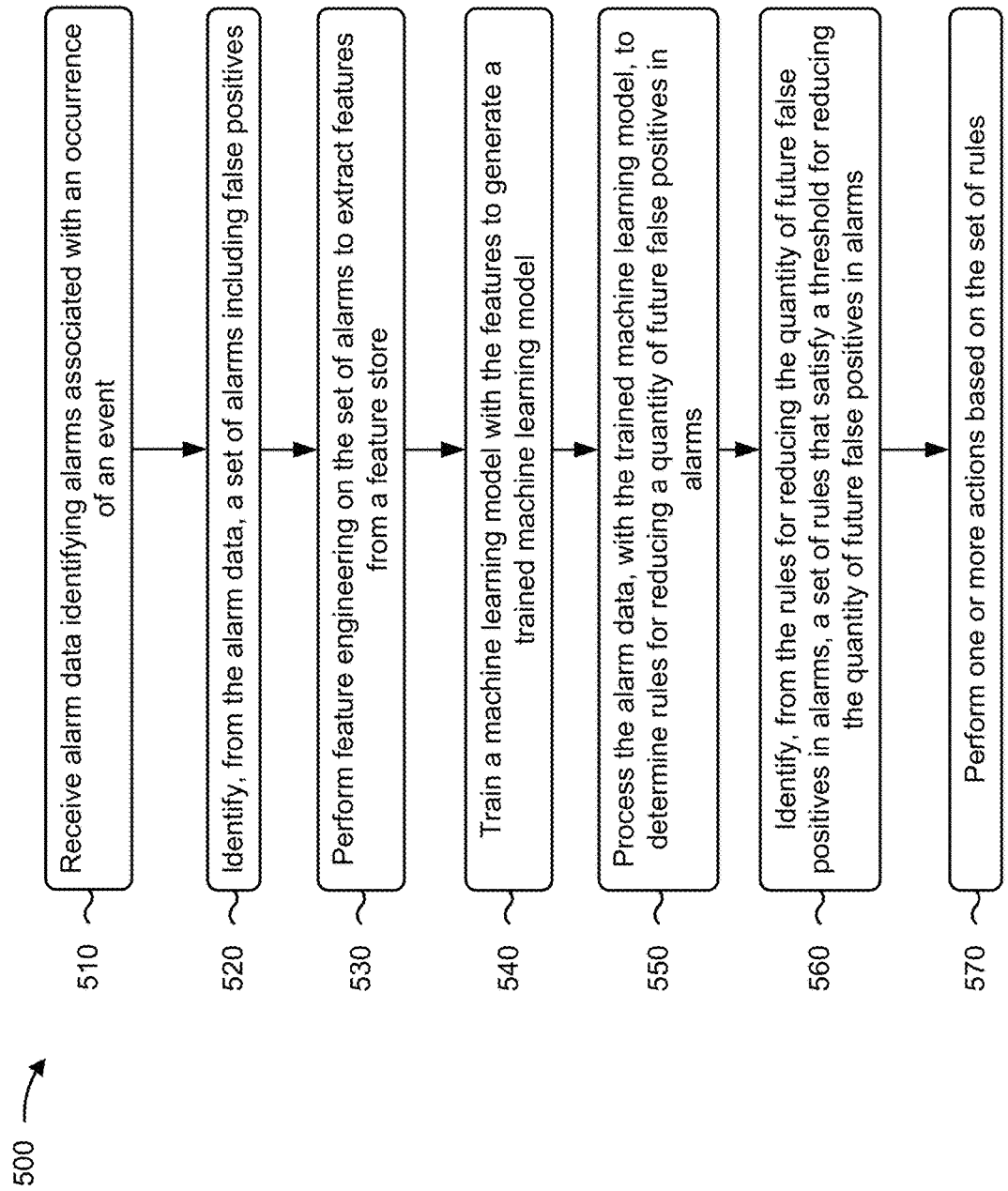
FIG. 5 is a flowchart of an example process relating to reducing a quantity of false positive alarms associated with rule-based alarms.

FIG. 5 is a flowchart of an example process 500 associated with reducing a quantity of false positives in rule-based alarms. In some implementations, one or more process blocks of FIG. 5 may be performed by a device (e.g., control system 115). In some implementations, one or more process blocks of FIG. 5 may be performed by another device or a group of devices separate from or including the device, such as a user device (e.g., user device 105) and/or a server device (e.g., server device 110). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving alarm data identifying alarms associated with an occurrence of an event (block 510). For example, the device may receive alarm data identifying alarms associated with an occurrence of an event, as described above. In some implementations, the device may receive the alarm data from a detection system that generates the alarms associated with detecting the occurrence of the event.

As further shown in FIG. 5, process 500 may include identifying, from the alarm data, a set of alarms including false positives (block 520). For example, the device may identify, from the alarm data, a set of alarms including false positives, as described above. In some implementations, the device may determine a plurality of alarms including false positives from the alarm data. The device may determine a quantity of the plurality of alarms including false positives satisfies a quantity threshold. The device may identify the plurality of alarms including false positives as the set of alarms including false positives based on the quantity of the plurality of alarms including false positives satisfying the quantity threshold.

Alternatively, and/or additionally, the device may determine hit rates associated with the plurality alarms. The device may determine precisions associated with the plurality of alarms. The device may identify the set of alarms including false positives based on the hit rates and the precisions.

As further shown in FIG. 5, process 500 may include performing feature engineering on the set of alarms to extract features from a feature store (block 530). For example, the device may perform feature engineering on the set of alarms to extract features from a feature store, as described above. In some implementations, when performing the feature engineering, the device may perform data binning on the set of alarms to generate a binning mapper file and a binned feature set that corresponds to the features.

As further shown in FIG. 5, process 500 may include training a machine learning model with the features to generate a trained machine learning model (block 540). For example, the device may train a machine learning model with the features to generate a trained machine learning model, as described above. The device may build a decision tree model on top of the features to generate a decision tree classifier model. The device may generate a rules file based on the decision tree classifier model. The decision tree classifier model and/or the rules file may correspond to the trained machine learning model.

As further shown in FIG. 5, process 500 may include processing the alarm data, with the trained machine learning model, to determine rules for reducing a quantity of future false positives in alarms (block 550). For example, the device may process the alarm data, with the trained machine learning model, to determine rules for reducing a quantity of future false positives in alarms, as described above. In some implementations, the device may convert the alarm data into a format that enables the trained machine learning model to process the alarm data. The device may process the alarm data, with the trained machine learning model, based on converting the alarm data into the format that enables the trained machine learning model to process the alarm data.

As further shown in FIG. 5, process 500 may include identifying, from the rules for reducing the quantity of future false positives in alarms, a set of rules that satisfy a threshold for reducing the quantity of future false positives in alarms (block 560). For example, the device may identify, from the rules for reducing the quantity of future false positives in alarms, a set of rules that satisfy a threshold for reducing the quantity of future false positives in alarms, as described above. The set of rules may cause a detection system to generate fewer false positives in alarms than false positives in alarms included in the alarm data.

The device may compare the rules for reducing the quantity of future false positives in alarms with the threshold for reducing the quantity of future false positives in alarms. The device may identify the set of rules based on comparing the rules for reducing the quantity of future false positives in alarms with the threshold for reducing the quantity of future false positives in alarms.

In some implementations, the device may determine recalls associated with the rules for reducing the quantity of future false positives in alarms. The device may determine precisions to reduce false positives in alarms associated with the rules for reducing the quantity of future false positives in alarms. The device may determine abilities to detect additional occurrences of an event associated with the rules for reducing the quantity of future false positives in alarms. The device may identify the set of rules based on the recalls, the precisions to reduce false positives in alarms, and the abilities to detect additional occurrences of the event.

As further shown in FIG. 5, process 500 may include performing one or more actions based on the set of rules (block 570). For example, the device may perform one or more actions based on the set of rules, as described above. In some implementations, performing the one or more actions includes the device providing the set of rules to one or more users associated with a detection system, the device causing the set of rules to be implemented in the detection system, the device providing the set of rules to a chain of command for approval and implementation in a detection system, the device retraining the machine learning model based on the set of rules, the device implementing the set of rules in a detection system, the device receiving feedback from the detection system based on implementing the set of rules, and/or the device modifying the machine learning model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, alarm data identifying alarms associated with occurrences of an event;
determining, by the device, hit rates associated with the alarms of the alarm data;
determining, by the device, precisions associated with the alarms of the alarm data;
identifying, by the device, from the alarm data, and based on the hit rates and the precisions, a set of alarms that include false positives;
performing, by the device, feature engineering on the set of alarms to extract features from a feature store;
training, by the device, a model with the features to generate a trained model;
processing, by the device, the alarm data, with the trained model, to determine rules for reducing a quantity of future alarms that include the false positives;
identifying, by the device and from the rules for reducing the quantity of future alarms that include the false positives, a set of rules that satisfy a threshold for reducing the quantity of future alarms that include the false positives; and
performing, by the device, one or more actions based on the set of rules.

2. The method of claim 1, wherein receiving the alarm data comprises:
receiving the alarm data from a fraud detection system that generates the alarms associated with the occurrence of the event,
wherein the occurrences of the event includes occurrences of a fraudulent activity.

3. The method of claim 1, wherein receiving the alarm data comprises:
receiving the alarm data from a network security detection system,
wherein the occurrences of the event includes occurrences of a network security event.

4. The method of claim 1, wherein performing the feature engineering on the set of alarms to extract the features from the feature store comprises:
performing data binning on the set of alarms to generate a binning mapper file and a binned feature set that corresponds to the features.

5. The method of claim 1, wherein training the model with the features to generate the trained model comprises:
building a decision tree model on top of the features to generate a decision tree classifier model; and
generating a rules file based on the decision tree classifier model,
wherein the decision tree classifier model and the rules file correspond to the trained model.

6. The method of claim 1, wherein identifying, from the rules for reducing the quantity of future alarms that include the false positives, the set of rules comprises:
comparing the rules for reducing the quantity of future alarms that include the false positives with the threshold for reducing the quantity of future alarms that include the false positives; and
identifying the set of rules based on comparing the rules for reducing the quantity of future alarms that include the false positives with the threshold for reducing the quantity of future alarms that include the false positives.

7. The method of claim 1, wherein the hit rates indicate a quantity of the alarms; and
wherein the precisions indicate a percentage of the alarms that include the false positives.

8. A device, comprising:
one or more memories; and
one or more processors, coupled to the one or more memories, configured to:
receive alarm data identifying alarms associated with occurrences of an event;
determine hit rates associated with the alarms of the alarm data;
determine precisions associated with the alarms of the alarm data;
identify, from the alarm data and based on the hit rates and the precisions, a set of alarms that include false positives;
perform feature engineering on the set of alarms to extract features from a feature store;
train a machine learning model with the features to generate a trained model;
convert the alarm data into a format that enables the trained model to process the alarm data;
process the alarm data, with the trained model, to determine rules for reducing a quantity of future alarms that include the false positives;
identify, from the rules for reducing the quantity of future alarms that include the false positives, a set of rules that satisfy a threshold for reducing the quantity of future alarms that include the false positives; and
perform one or more actions based on the set of rules.

9. The device of claim 8, wherein the one or more processors, when identifying the set of rules, are configured to:
determine recalls associated with the rules for reducing the quantity of future alarms that include the false positives;
determine abilities to detect additional occurrences of the event associated with the rules for reducing the quantity of future alarms that include the false positives; and
identify the set of rules based on the recalls and the abilities to detect additional occurrences of the event.

10. The device of claim 8, wherein the one or more processors, when performing the one or more actions, are configured to one or more of:
provide the set of rules to one or more users associated with a detection system that generated the alarms; or
cause the set of rules to be implemented in the detection system.

11. The device of claim 8, wherein the one or more processors, when performing the one or more actions, are configured to one or more of:
provide the set of rules to a chain of command for approval and implementation in a detection system; or
retrain the trained model based on the set of rules.

12. The device of claim 8, wherein the one or more processors, when performing the one or more actions, are configured to:
implement the set of rules in a detection system;
receive feedback from the detection system based on implementing the set of rules; and
modify the trained model based on the feedback.

13. The device of claim 8, wherein the set of rules causes a detection system to generate fewer alarms that include the false positives than a quantity of alarms that include the false positives included in the alarm data.

14. The device of claim 8, wherein the hit rates indicate a quantity of the alarms; and
wherein the precisions indicate a percentage of the alarms that include the false positives.

15. A non-transitory computer-readable medium storing a set of instructions, the set of instructions comprising:
one or more instructions that, when executed by one or more processors of a device, cause the device to:
receive, from a detection system, alarm data identifying alarms generated by the detection system;
determine hit rates associated with the alarms of the alarm data;
determine precisions associated with the alarms of the alarm data;
identify, from the alarm data and based on the hit rates and the precisions, a set of alarms that include false positive alarms;
perform feature engineering on the set of alarms to extract features from a feature store;
train a model with the features to generate a trained model;
process the alarm data, with the trained model, to determine rules for reducing a quantity of future alarms that include the false positive alarms;
identify, from the rules for reducing the quantity of future alarms that include the false positive alarms, a set of rules that satisfy a threshold for reducing the quantity of future alarms that include the false positive alarms; and
perform one or more actions based on the set of rules.

16. The non-transitory computer-readable medium of claim 15, wherein the one or more instructions, that cause the device to perform the feature engineering on the set of alarms to extract the features from the feature store, cause the device to:

perform data binning on the set of alarms to generate a binning mapper file and a binned feature set that corresponds to the features.

17. The non-transitory computer-readable medium of claim 15, wherein the one or more instructions, that cause the device to train the model with the features to generate the trained model, cause the device to:
build a decision tree model on top of the features to generate a decision tree classifier model; and
generate a rules file based on the decision tree classifier model,
wherein the decision tree classifier model and the rules file correspond to the trained model.

18. The non-transitory computer-readable medium of claim 15, wherein the one or more instructions, that cause the device to identify the set of rules, cause the device to:
determine recalls associated with the rules for reducing the quantity of future alarms that include the false positive alarms;
determine abilities to detect an occurrence of an event associated with the rules for reducing the quantity of future alarms that include the false positive alarms; and
identify the set of rules based on the recalls and the abilities to detect the occurrence of the event.

19. The non-transitory computer-readable medium of claim 15, wherein the hit rates indicate a quantity of the alarms; and
wherein the precisions indicate a percentage of the alarms that include the false positives.

20. The non-transitory computer-readable medium of claim 15, wherein the precisions indicate a percentage of the alarms that include the false positives.

* * * * *